United States Patent Office 2,832,736
Patented Apr. 29, 1958

2,832,736

SOLUBLE OIL

James L. Jezl, Swarthmore, Pa., assignor to Sun Oil Company, Philadelphia, Pa., a corporation of New Jersey No Drawing. Application November 13, 1952
Serial No. 320,355

5 Claims. (Cl. 252—33.3)

This invention relates to soluble oil compositions comprising mineral oil, alkali metal soaps of carboxylic acids obtained by partial oxidation of mineral oil, and an added organic compound.

It is known in the art to prepare soluble oil compositions which are emulsifiable in water to form oil-in-water emulsions by forming a mixture of mineral oil and alkali metal soap of carboxylic acids obtained by partial oxidation of mineral oil. Such compositions may be called for convenience "synthetic soluble oils" to distinguish them from soluble oil compositions which do not contain soaps of acidic products of oxidation of mineral oil.

Major problems involved in the preparation of such synthetic soluble oil compositions have been the obtaining of a stable, homogeneous mixture of oil and soap prior to emulsification and the obtaining of a stable emulsion after emulsification. The present invention provides a highly stable homogeneous mixture of oil and soap, and a highly stable emulsion, these effects being obtained by incorporation in the soluble oil of an organic compound as "coupling agent" or "mutual solvent," i. e. solvent for both oil and water. The organic compound employed has a dual function since it both stabilizes the soluble oil prior to emulsification and stabilizes the emulsion after emulsification.

The organic compound employed in minor proportion in synthetic soluble oils according to the present invention is a monoether of an aromatic-ring-containing monohydroxy compound and a polyethylene glycol, or more specifically the compound is an alkylphenyl monoether of a polyethylene glycol wherein $n$, the number of ethylene glycol units in the molecule, is within certain limits as subsequently specified. The compound contains an RO— linkage, where R is an alkylphenyl radical having its aromatic nucleus directly attached to the oxygen atom of the RO group, said radical containing $x$ carbon atoms, $x$ being an integer in the range from 11 to 28 inclusive. The number, $n$, of ethylene glycol units in the molecule is an integer in the range from 4 to 21 inclusive, $n$ also being within the range from $(n-8)$ to $(x-2)$ inclusive. Preferably $n$ is within the range from $(x-6)$ to $(x-4)$ inclusive.

The radical represented by R in the preceding description may be a mono- or poly-substituted phenyl radical, and the alkyl substituents may be either straight- or branched-chain. Examples of suitable R radicals are the following: n-butylphenyl, tertiarybutylphenyl, amylphenyl, hexylphenyl, octylphenyl, decylphenyl, dodecylphenyl, tetradecylphenyl, octadecylphenyl, docosylphenyl, diethylphenyl, methylpropyl phenyl, dibutylphenyl, dihexylphenyl, dioctylphenyl, didecylphenyl, etc.

The compound employed according to the invention is an alkylphenyl ether of a polyethylene glycol wherein $n$ is the number of ethylene glycol units in the molecule. That number must be within the limits previously stated, i. e. $(x-8)$ to $(x-2)$, in order to obtain satisfactory results. An octylphenyl ether having 4 ethylene glycol units, for example, has been found to be unsatisfactory for use according to the invention whereas an octylphenyl ether having 8 ethylene glycol units has been found to be highly satisfactory; in the case of the former ether, the 4 ethylene glycol units in the molecule are not within the permissible limits of 6 to 12, $x$ being 14 in an octylphenyl ether, whereas in the case of the latter ether, the 8 ethylene glycol units in the molecule are within the permissible limits of 6 to 12.

The organic compound employed according to the invention as a coupling agent or mutual solvent for synthetic soluble oils may be used if desired in conjunction with other coupling agents or mutual solvents, e. g. monobutyl ether of ethylene glycol. Also mixtures of two or more couplings agents according to the present invention may be employed.

The soluble oil composition according to the present invention comprises mineral oil, alkali metal soap of carboxylic acids obtained by partial oxidation of mineral oil, and an organic compound as specified above. It is generally preferred that the composition should also contain other constituents such as petroleum sulfonates and small amounts of excess alkali metal hydroxide and water. In some cases, it may be desirable to incorporate in the soluble oil alkali metal soap of petroleum naphthenic acids. Also, in some cases, it may be desirable to incorporate in the soluble oil the entire product of oxidation of mineral oil, rather than just a predominantly carboxylic acid portion thereof.

The mineral lubricating oil employed in the soluble oil composition according to the invention preferably has S. U. viscosity at 100° F. within the range from 40 to 120. The mineral oil which is used as oxidation charge, on the other hand, preferably has S. U. viscosity at 100° F. within the range from 125 to 200. A preferred oxidation charge is petroleum foots oil, but mineral lubricating oils may also be used. Mineral oil, as the term is used in connection with the oxidation charge, is understood to include petroleum wax, preferably paraffin wax having melting point not greater than 100° F., as well as normally liquid oils.

Petroleum foots oil is the oily byproduct obtained in the deoiling of slack wax. When the deoiling is done by sweating the foots oil is sometimes called sweat oil or sweater oil. When the deoiling is done by filtration of a solution of the slack wax in a solvent for oil, the filtrate obtained is a solution of foots oil in the solvent used, e. g. methyl ethyl ketone or mixtures thereof with toluene and/or benzene. Petroleum foots oils generally contain substantial amounts of low-melting wax in addition to lubricating oil, the amount of wax depending on the filtration temperature and other variables.

The oxidation charge should have sufficiently low content of aromatic compounds so that there is no substantial inhibition of the oxidation by aromatic compounds. Therefore, a preferred foots oil charge is one obtained from deoiling of slack wax from a solvent-refined lubricating oil, e. g. a furfural-refined lubricating oil.

The oxidized mineral oil used in compositions according to the invention can be prepared in any suitable manner. For example, it may be prepared by contacting the heated charge oil in liquid state with a free-oxygen-containing gas, e. g. air, oxygen, ozonized air, etc. The oxidation is preferably conducted under atmospheric pressure or relatively low elevated pressure not exceeding, for example, 100 p. s. i. g. Such operation is advantageous in that the vent gases carry off some of the lower-boiling acidic products, which are undesirable in the soluble oil, and which in operation at higher pressures would remain in the liquid oxidation product. The oxidation is preferably conducted in the presence of an oxidation catalyst, such as manganese naphthenate, manganese soaps of fatty acids, manganese soaps of carboxylic acids obtained in previous oxidations of mineral oil, etc.

The oxidation preferably is continued at least until the saponification number of the liquid oxidation product is 60, and is terminated before the saponification number of the liquid oxidation product exceeds 120, preferably before the saponification number exceeds 100. Oxidation to too high a saponification number tends to result in formation of oxidation products which have adverse effect on the soluble oil.

Preferably the sulfonate concentration of synthetic soluble oils according to the invention is sufficient to provide a sulfonate saponification number equivalent of at least 3. Generally, the sulfonate saponification number equivalent is not greater than 10, more preferably not greater than 7. The sulfonate saponification number equivalent is determined by measurement, in mg. of KOH per gram, of the saponification number of the sulfonate-containing material prior to mixing with other saponifiable components of the soluble oil, and multiplying the saponification number thus obtained by the weight fraction of the sulfonate-containing material in the compounded soluble oil.

Preferably, the concentration of carboxyl-containing materials in the soluble oils according to the invention is sufficient to provide a carboxylate saponification number equivalent of at least 10, more preferably at least 14. Generally, the carboxylate saponification number equivalent is not greater than 20, more preferably not greater than 17. The carboxylate saponification number equivalent may be determined in a manner generally similar to that described for determination of sulfonate saponification number equivalents.

The synthetic soluble oils according to the invention are preferably alkaline, having for example free alkalinity within the range 0.01 to 0.12 percent as NaOH.

A preferred range of coupling agent concentration in the soluble oil according to the invention is from 1.25 to 3.0 volume percent. A preferred range of water concentration in the soluble oil is from 2.25 to 5.0 volume percent, more preferably from 2.75 to 4.25 volume percent. Generally, for a given soluble oil there should be at least a certain amount of coupling agent to obtain satisfactory results, but this amount varies for different properties and relative proportions of the other constituents of the soluble oil. Also, there should generally, for satisfactory results, be a water content within certain upper and lower limits, but these limits also vary for different properties and relative proportions of the other constituents of the soluble oil.

Polyethylene glycol ethers employed according to the invention may be mixtures of various ethers having different numbers of ethylene glycol units per molecule. The average number of ethylene glycol units per molecule in such mixtures is the basis to be used in determining whether the mixture is suitable for use according to the invention; i. e., such average number should be within the range from $(x-8)$ to $(x-2)$, where $x$ is the number of carbon atoms in the alkyl phenyl radical. The average number of ethylene glycol units in the mixture may be considered to be a number such that the molar equivalents of constituents having lesser numbers of ethylene glycol units per molecule are approximately equal in the mixture to the molar equivalents of constituents having greater numbers of ethylene glycol units per molecule.

The following examples illustrate the invention:

EXAMPLE I

Synthetic soluble oils were prepared by admixing the following materials in the stated amounts:

Mineral lubricating oil_____grams__ 490
Partially oxidized petroleum foots oil_____do____ 108
Petroleum naphthenic acids_____do____ 140
Petroleum mahogany sulfonates (10.9% solution in mineral oil)_____do____ 250
Caustic soda, 50° Bé_____milliliters__ 17.5 the water content of the soluble oil being adjusted to different levels in different soluble oils, and octylphenyl ether of polyethylene glycol having an average of eight glycol units per molecule being added in various amounts to obtain different contents of that ether in different soluble oils.

The mineral lubricating oil employed had S. U. viscosity at 100° F. of about 100. The petroleum naphthenic acids had saponification number of 61 and contributed to the soluble oil a saponification number equivalent of 8.5. The petroleum sulfonates were sodium soaps of sulfonic acids having saponification number of 13.2, and contributed 3.3 saponification number equivalent to the soluble oil. The compound soluble oil had free alkalinity of about 0.09–0.10 percent as NaOH.

The oxidized foots oil employed was obtained by blowing air through a foots oil obtained in the solvent deoiling of slack wax, the oxidation being conducted at atmospheric pressure and 260–320° F. in the presence of a manganese-naphthenate containing catalyst. The oxidation was terminated when the total liquid oxidation product had saponification number of 78, and 108 grams of that product were incorporated in the soluble oil to contribute saponification number equivalent of 8.5.

The various soluble oils prepared as above described were each tested for "oil stability," or stability prior to emulsification in water, and for "emulsion stability," or stability in aqueous emulsion.

The oil stability was determined by allowing the soluble oil to stand at 10° F. for 48 to 72 hours and then observing the soluble oil to determine whether discernible haziness, gelation or separation of an upper oil layer from the mixture of oil and soap had taken place. If such undesirable effects had not taken place, the soluble oil was rated stable; otherwise, unstable.

The emulsion stability was determined by emulsifying 10 volume percent of the soluble oil in 90 volume percent of added 45° F. tap water having calcium hardness less than 100 p. p. m. as $CaCO_3$, allowing the resulting emulsion to come to room temperature while standing for 24 hours, then observing the emulsion at room temperature to determine the emulsion stability. The emulsion was rated stable if the emulsion surface was bright, or if it was only slightly dull, with very little or no "cream" on the emulsion surface. The emulsion was rated unstable if there was a substantial amount of cream or "scum" or free oil on the emulsion surface.

The results obtained with various combinations of water and ether content were as follows:

| Volume Percent Water | Volume Percent Ether | Oil Stability | Emulsion Stability |
|---|---|---|---|
| 3.0 | 1.5 | Stable | Stable. |
| 3.5 | 1.5 | ____do____ | Do. |
| 4.0 | 1.5 | ____do____ | Do. |
| 3.0 | 2.0 | ____do____ | Do. |
| 3.5 | 2.0 | ____do____ | Do. |

In the absence of the ether, the oil and emulsion are both unstable.

This table shows that highly satisfactory results are obtained with water contents from 3.0 to 4.0 volume percent and ether contents from 1.5 to 2.0 percent.

EXAMPLE II

Synthetic soluble oils were prepared in the same manner as in Example I except that an octylphenyl ether of a polyethylene glycol having an average of 10 ethylene glycol units per molecule, as represented by the formula $C_8H_{17}C_6H_4OCH_2(CH_2OCH_2)_9CH_2OH$, was employed in place of the coupling agent used in Example I. The results obtained were as follows:

| Volume Percent Water | Volume Percent Ether | Oil Stability | Emulsion Stability |
| --- | --- | --- | --- |
| 3.0 | 1.5 | Stable | Stable. |
| 3.5 | 1.5 | ----do---- | Do. |
| 4.0 | 1.5 | ----do---- | Do. |
| 3.0 | 2.0 | ----do---- | Do. |

This table shows that highly satisfactory results are obtained with water contents from 3.0 to 4.0 volume percent and ether contents from 1.5 to 2.0 percent.

*Comparison example*

Synthetic soluble oils were prepared in the same manner described in Example I except that octylphenyl ether of polyethylene glycol having an average of 4 ethylene glycol units per molecule was employed as coupling agent in place of the coupling agent used in Example I. The following results were obtained:

| Vol. Percent Water | Vol. Percent Ether | Oil Stability | Emulsion Stability |
| --- | --- | --- | --- |
| 2.0 | 0.5 | Unstable | Unstable. |
| 2.0 | 1.0 | ----do---- | Do. |
| 2.0 | 2.0 | ----do---- | Do. |
| 3.0 | 0.5 | Stable | Do. |
| 3.0 | 1.0 | ----do---- | Do. |
| 3.0 | 2.0 | Unstable | Do. |
| 4.0 | 0.5 | Stable | Do. |
| 4.0 | 1.0 | ----do---- | Do. |
| 4.0 | 2.0 | Unstable | Do. |

This table shows that an octylphenyl ether having 4 ethylene glycol units gives unsatisfactory emulsion stabilities, whereas an octylphenyl ether having 8 ethylene glycol units gave highly satisfactory emulsion stabilities.

EXAMPLE III

The two synthetic soluble oils employed in Examples I and II containing respectively two different ethers, were tested for emulsion stability in hard water emulsions. The hard water employed was prepared by addition of calcium-, magnesium-, and chloride-containing materials to water to obtain calcium and magnesium content equivalent to 300 p. p. m. of $CaCO_3$, and chloride content equivalent to 100 p. p. m. of NaCl. 10 volume percent emulsions in hard water at 45° F. were prepared and allowed to come to room temperature while standing for 24 hours, at the end of which time the emulsions were observed to determine their stabilities. An emulsion was rated stable if there was light cream or scum, or no cream or scum on the emulsion surface; unstable, if there was heavy cream or scum, or free oil on the emulsion surface. Relatively soft water emulsions, as described in Example I, were rated somewhat more rigorously than relatively hard water emulsions as in the present example, since hard water emulsions generally tend to be less stable than corresponding soft water emulsions, and the soft water emulsions are therefore subjected to a higher standard, in order to provide that a satisfactory soluble oil from the standpoint of soft water emulsions will also, in most instances, be satisfactory from the standpoint of hard water emulsions.

With octylphenyl ether of polyethylene glycol having an average of 8 ethylene glycol units per molecule highly satisfactory hard water emulsion stabilities and oil stabilities (as determined after one month at 70° F.) were obtained at ether content of 1.5 volume percent with water contents from 2.8 to 3.6 volume percent, and at ether content of 1.75 volume percent with water contents from 2.8 to 3.8 volume percent. With octylphenyl ether of polyethylene glycol having an average of 10 ethylene glycol units per molecule, highly satisfactory emulsion stabilities and oil stabilities were obtained at ether content of 1.25 volume percent with water contents from 2.8 to 3.0 volume percent, at ether content of 1.5 volume percent with water contents from 2.8 to 3.4 volume percent, and at ether content of 1.75 volume percent with water contents from 2.8 to 3.0 volume percent.

The invention claimed is:

1. A soluble oil composition comprising: mineral lubricating oil; alkali metal soap of carboxylic acids obtained by partial oxidation of mineral oil, the carboxyl saponification number equivalent being within the range from 10 to 20 mg. of KOH per gram; alkali metal soap of petroleum mahogany sulfonic acids, the sulfonate saponification number equivalent being within the approximate range from 3 to 10 mg. of KOH per gram; 2.25 to 5.0 volume percent of water; and 1.25 to 3.0 volume percent of an alkyl-phenyl mono ether of a polyethylene glycol, the alkylphenyl radical having its aromatic nucleus directly attached to the oxygen atom of the terminal ether linkage of the polyethylene glycol radical, said alkylphenyl radical containing $x$ carbon atoms, $x$ being an integer in the range from 11 to 28 inclusive, said ether containing $n$ ethylene glycol units in the molecule, $n$ being a positive integer from 4 to 21 inclusive and within the range from $(x-8)$ to $(x-2)$ inclusive.

2. Composition according to claim 1 wherein said ether is an octylphenyl ether of a polyethylene glycol having eight ethylene glycol units per molecule.

3. Composition according to claim 1 wherein said ether is an octylphenyl ether of a polyethylene glycol having ten ethylene glycol units per molecule.

4. A soluble oil composition comprising: mineral lubricating oil; alkali metal soap of petroleum mahogany sulfonic acids; alkali metal soap of petroleum naphthenic acids; alkali metal soap of carboxylic acids obtained by partial oxidation of mineral oil; 2.25 to 5.0 volume percent of water; and 1.25 to 3.0 volume percent of an alkylphenyl mono ether of a polyethylene glycol, the alkylphenyl radical having its aromatic nucleus directly attached to the oxygen atom of the terminal ether linkage of the polyethylene glycol radical, said alkylphenyl radical containing $x$ carbon atoms, $x$ being an integer in the range from 11 to 28 inclusive, said ether containing $n$ ethylene glycol units in the molecule, $n$ being a positive integer from 4 to 21 inclusive and within the range from $(x-8)$ to $(x-2)$ inclusive; said soluble oil having sulfonate saponification number equivalent within the range from 3 to 10 mg. of KOH per gram and carboxylate saponification number equivalent within the range from 10 to 20 mg. of KOH per gram.

5. A soluble oil composition comprising: mineral lubricating oil having S. U. viscosity at 100° F. within the range from 40 to 120 seconds; alkali metal soap of petroleum mahogany sulfonic acids; alkali metal soap of petroleum naphthenic acids; a saponified oxidation product mixture obtained by partially oxidizing petroleum foots oil in liquid phase at a temperature in the range from 260° F. to 320° F. and a pressure from atmospheric to 100 p. s. i. g. in the presence of a metallic oxidation catalyst until the saponification number of the oxidation product mixture is within the range from 60 to 120 mg. of KOH per gram, and saponifying said oxidation product mixture with an alkali metal basic compound; 2.25 to 5.0 volume percent of water; and 1.25 to 3.0 volume percent of an alkyl-phenyl mono ether of a polyethylene glycol, the alkylphenyl radical having its aromatic nucleus directly attached to the oxygen atom of the terminal ether linkage of the polyethylene glycol radical, said alkylphenyl radical containing $x$ carbon atoms, $x$ being an integer in the range from 11 to 28 inclusive, said ether containing $n$ ethylene glycol units in the molecule, $n$ being a positive integer from 4 to 21 inclusive; said soluble oil having sulfonate saponification number equivalent within the approximate range from 3 to 10 mg. of KOH per gram and carboxylate saponification number equivalent within the approximate range from 10 to 20 mg. of KOH per gram, approximately half of said carboxylate saponification number being supplied by said oxidation product mixture.

References Cited in the file of this patent

UNITED STATES PATENTS

| | | |
|---|---|---|
| 2,043,922 | Burwell | June 9, 1936 |
| 2,470,913 | Bjorksten | May 24, 1949 |
| 2,553,601 | Veatch et al. | May 22, 1951 |
| 2,626,240 | Deutser et al. | Jan. 20, 1953 |
| 2,692,859 | Talley et al. | Oct. 26, 1954 |

OTHER REFERENCES

"Cellosolve" and "Carbitol" Solvents, Carbide and Carbon Chemical Corp., 1947, pages 3 to 6.

"Metal Working Lubricants," by Bastian. McGraw-Hill Pub. Co., 1951, page 6.